(12) United States Patent
Pagidipala et al.

(10) Patent No.: US 12,292,877 B2
(45) Date of Patent: May 6, 2025

(54) FILE ENRICHMENT FOR AUTOMATIC DATABASE UPDATE

(71) Applicant: Truist Bank, Charlotte, NC (US)

(72) Inventors: Lenin Kumar Pagidipala, Atlanta, GA (US); Jonathan Topp, Montpelier, VA (US); Omganesh Teekaramsingh, Johns Creek, GA (US)

(73) Assignee: Truist Bank, Charlotte, NC (US)

( * ) Notice: Subject to any disclaimer, the term of this patent is extended or adjusted under 35 U.S.C. 154(b) by 5 days.

(21) Appl. No.: 18/207,740

(22) Filed: Jun. 9, 2023

(65) Prior Publication Data
US 2024/0411745 A1    Dec. 12, 2024

(51) Int. Cl.
*G06F 16/23*    (2019.01)
*G06F 16/11*    (2019.01)
*G06F 16/14*    (2019.01)

(52) U.S. Cl.
CPC ........ *G06F 16/2365* (2019.01); *G06F 16/116* (2019.01); *G06F 16/148* (2019.01)

(58) Field of Classification Search
CPC .................................................. G06F 16/2365
USPC ......................................................... 707/809
See application file for complete search history.

(56) References Cited

U.S. PATENT DOCUMENTS

| | | | | |
|---|---|---|---|---|
| 2003/0158811 | A1* | 8/2003 | Sanders ................ | G06Q 20/00 705/34 |
| 2009/0154699 | A1* | 6/2009 | Tserkovny ............ | G06Q 30/04 380/255 |
| 2017/0242863 | A1* | 8/2017 | Dorairajan ........... | G06F 16/116 |
| 2018/0336554 | A1* | 11/2018 | Trotter ................ | H04L 63/0853 |
| 2021/0173854 | A1* | 6/2021 | Wilshinsky ............ | G06F 9/451 |

\* cited by examiner

*Primary Examiner* — Syling Yen
(74) *Attorney, Agent, or Firm* — Kilpatrick Townsend & Stockton LLP; Michael A. Springs, Esq.

(57) ABSTRACT

A system can be used to automatically update a target database. The system can receive input files from an initial database that includes data in a first format. The system can generate enriched files that include entity functions, user functions, and direct updates based on the input files. The system can generate requests based on the entity functions, the user functions, and the direct updates. The enriched files can have a second format that is different than the first format. The system can generate validated enriched files by validating the enriched files and the requests. The system can initiate an automatic update of a target database by transmitting the validated enriched files to the target database that is compatible with the second format.

14 Claims, 3 Drawing Sheets

FILE ENRICHMENT FOR AUTOMATIC DATABASE UPDATE

TECHNICAL FIELD

The present disclosure relates generally to data management and, more particularly (although not necessarily exclusively), to enriching files for a database update process.

BACKGROUND

Filing systems, whether digital or by paper, may vary in format. Files in one format may not be correctly interpreted when submitted to a system designed to receive a different format. For example, a record may have an address in a second field of the record. The record, which may be designed for a first database, may be migrated to a second database expecting different information in the second field of the record. As a result, the second database may record incorrect information or may reject the information.

SUMMARY

In some examples, a system can be used for file enrichment for an automatic database update. The system can include a processor and a non-transitory computer-readable medium comprising instructions that are executable by the processor to cause the processor to perform various operations. The system can receive a set of input files from an initial database that comprises data in a first format. The system can enrich the set of input files to generate a set of enriched files by (i) generating a set of entity functions, a set of user functions, and a set of direct updates based on the set of input files, and (ii) generating a set of requests based on the set of entity functions, the set of user functions, and the set of direct updates, the set of enriched files having a second format that is different than the first format. The system can generate a validated set of enriched files by validating the set of enriched files and the set of requests. The system can initiate an automatic update of a target database by transmitting the validated set of enriched files to the target database that is compatible with the second format.

In other examples, a method can be used for file enrichment for an automatic database update. The method can include receiving, by a computing device, a set of input files from an initial database that comprises data in a first format. The method can include enriching, by the computing device, the set of input files to generate a set of enriched files by (i) generating a set of entity functions, a set of user functions, and a set of direct updates based on the set of input files, and (ii) generating a set of requests based on the set of entity functions, the set of user functions, and the set of direct updates, the set of enriched files having a second format that is different than the first format. The method can include generating, by the computing device, a validated set of enriched files by validating the set of enriched files and the set of requests. The method can include initiating, by the computing device, an automatic update of a target database by transmitting the validated set of enriched files to the target database that is compatible with the second format.

In yet other examples, a non-transitory computer-readable medium can be used for file enrichment for an automatic database update. The non-transitory computer-readable medium can include instructions that are executable by a processing device for causing the processing device to perform various operations. The operations can include receiving a set of input files from an initial database that comprises data in a first format. The operations can include enriching the set of input files to generate a set of enriched files by (i) generating a set of entity functions, a set of user functions, and a set of direct updates based on the set of input files, and (ii) generating a set of requests based on the set of entity functions, the set of user functions, and the set of direct updates, the set of enriched files having a second format that is different than the first format. The operations can include generating a validated set of enriched files by validating the set of enriched files and the set of requests. The operations can include initiating an automatic update of a target database by transmitting the validated set of enriched files to the target database that is compatible with the second format.

DETAILED DESCRIPTION

Figure 1:
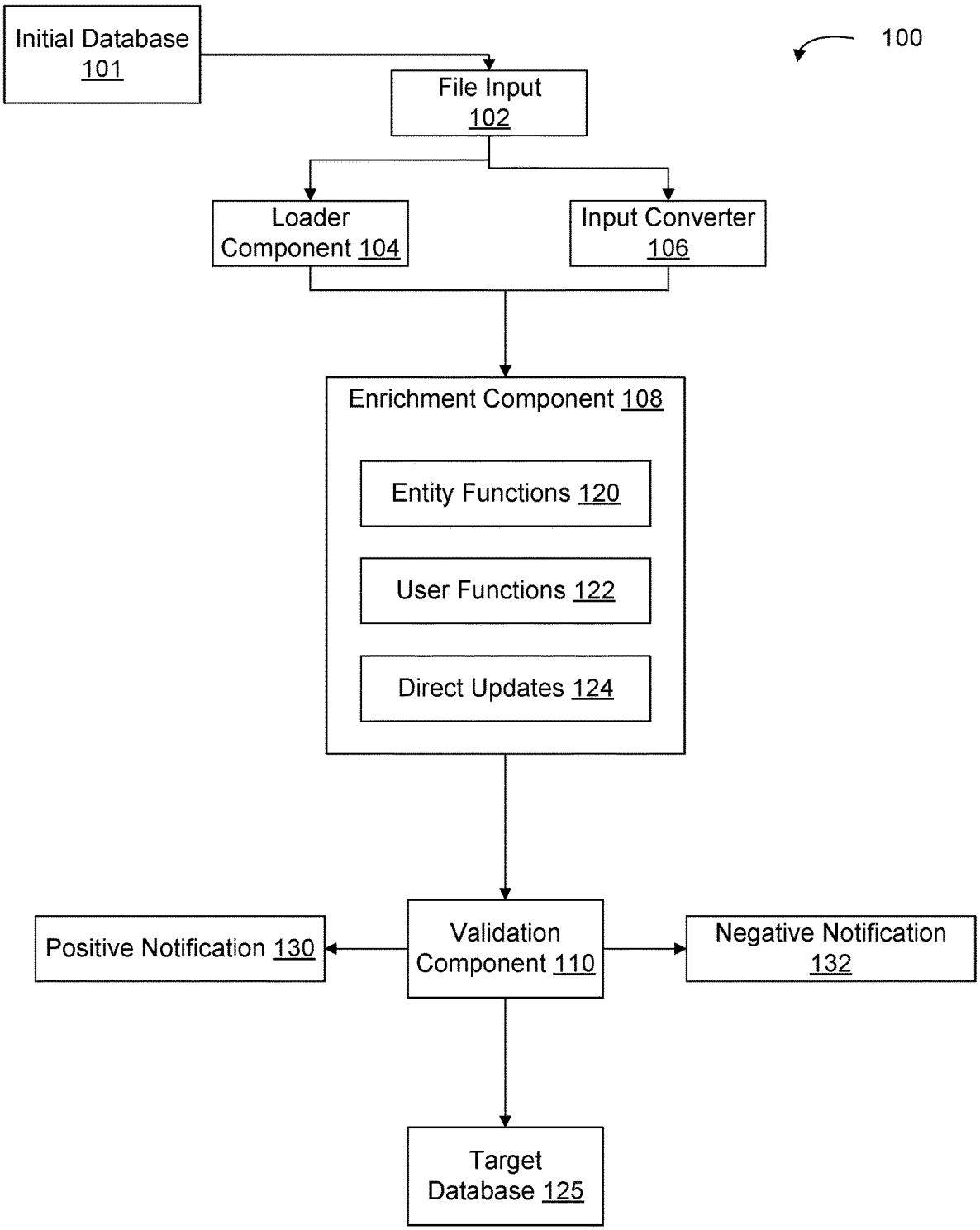
FIG. 1 is a block diagram of a computing environment in which one or more files can be enriched for an automatic database update according to some examples of the present disclosure.

Certain aspects and examples of the present disclosure relate to enriching files for a database update process. Enriching files may involve recognizing data types within fields of a file, splitting data to occupy a greater number of fields, compressing data to occupy a smaller number of fields, reordering data fields, or changing the number of data fields to make a file adhere to an updated format. The files may be or include a collection of files subjected to the enrichment process. The size and initial format of the files may be determined by available computing resources. A migration tool may be a component of a system that receives input files and enriches the files for the database update process. For example, entity account records from disparate, outdated systems may be enriched before being transmitted to a target database.

Updating a database, for example to adhere to a new format, can involve updating a large number (e.g., 1000, 10,000, 100,000 or more) of files. In some examples, the large number of files may be stored in a first database, and the large number of files may be transferred to a second database with a storage format or file format different than that of the first database. In other examples, the first database may have a corresponding format updated, and the large number of files included in the first database may have their respective formats updated to conform to the updated first database.

Updating the database may take a predetermined amount of time, which may exceed a few seconds, a few minutes, a few hours, a few days, etc., depending on a volume of data to transfer, update, or the like based on the updates to the database. During the predetermined amount of time, files included in the database may change. For example, the database may include entity account records (e.g., online security account records, financial institution records, and the like), and during the predetermined amount of time, one or more entities associated with the entity account records may make changes to the entity account records. Accurately updating the entity account records can be difficult using other techniques such as manual updates, partially automated updates, etc.

A system can automatically enrich files for automatically updating a database. The system can receive one or more files to be enriched for updating the database. For example, the system can retrieve the one or more files from an initial or existing database, from a target database (e.g., to be updated), or from other suitable sources for the one or more files, and the system can enrich the one or more files to enable the files to be stored in the target database. In some examples, enriching the one or more files may involve updating a format of the one or more files, adjusting a content of the one or more files, and the like.

Using the system to enrich the one or more files for automatically updating the target database can provide one or more technical solutions that address one or more technical problems relating to data management. For example, updating target databases can cause errors to be generated when updating one or more files included in the target databases or to be included in the target databases. Using the system to enrich the one or more files can reduce or eliminate instances of errors when updating one or more target databases. Additionally, using the system to enrich the one or more files can reduce or eliminate instances of unintended confidential data disclosure since the system can perform one or more validation processes configured to verify that confidential information is secure during and subsequent to updating the target database. Additionally, using the system to enrich the one or more files can improve the functioning of a computing device. For example, the system may use fewer computing resources (e.g., memory, processing power, and the like) to automatically update the database compared to other techniques to update a database.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a block diagram of a computing environment 100 in which one or more files can be enriched for an automatic database update according to some examples of the present disclosure. As illustrated, the computing environment 100 can include a file input 102, a loader component 104, an input converter 106, an enrichment component 108, a validation component, 110. Additionally, the computing environment 100 can include or otherwise be communicatively coupled with an initial database 101 and a target database 125.

The file input 102 may receive files of various formats and sizes from various databases (e.g., the initial database 101), entities, or the like. In some examples, the files may be related to one or more entities, one or more users, one or more accounts managed by the one or more entities or the one or more users, etc. For example, the file input 102 may receive medical records from various hospitals and the medical records may be in various formats. As another example, the file input 102 may receive various resource records from various resource providers. The file types may include or involve various extensions, various applications, various syntaxes, various scripts or magic numbers, various types of computer code or computer language, or various unique identifiers. The file input 102 may store the files in respective original formats in a cache associated with the computing environment 100.

The file input 102 may receive, for example from the initial database 101, or store input files into an array of files so that the files can be more easily processed with parallel processing methods such as via multiple processor threads or multiple distributed computing nodes. Assembling input files into an array of files may also reduce an amount of internal messages sent between components of the computing environment 100 to reduce processing time (e.g., processing or computing resources, etc.). The file input 102 may use an automated machine learning tool, such as a python-based tree-based pipeline optimization tool (TPOT), to interpret data from a reconciliation report and adjust or enhance (e.g., optimize) a number of input files included in the array of files. The TPOT may automatically adjust the number of files included in the array of files based on features within the files.

The loader component 104 may receive the input files from the file input 102. While the computing environment 100 may be able to digest and store a wide array of filetypes from their original database in their original formats, the loader component 104 may extract files from the array of files that may not be able to be digested by other components of the computing environment 100. The loader component 104 may pass the extracted files to a reconciliation component to generate the reconciliation report. The loader component 104 may audit the input files to ensure no expected files are missing. The computing environment 100 may include multiple loader components based on factors such as the number of files included in the array of files, the type or types of files included in the array of files, etc.

In some examples, the input files may be received in an expected file format. The expected file format may be or include XLS, XLSX, CSV, DOC, DOCX, PDF, and the like. The input converter 106 may be configured to convert the file format of the input files to the expected file format. Additionally, the input converter 106 may be configured to generate one or more requests based on the expected file type, or contents, of the input files. For example, the input converter 106 may generate a simple object access protocol (SOAP) request, a structured query language (SQL) query, etc., based on the expected file type, or contents, of the input files.

In some examples, the SOAP request may be used to request an update to the target database 125, and the SQL query may be used to directly update the target database 125. The SOAP request can be validated (e.g., by the validation component 110 or any other suitable component of or coupled to the computing environment 100) prior to being used to automatically updating the target database 125, for example to prevent or reduce instances in which errors may be introduced to the target database 125 via the automatic update. The SQL query may directly update the target database 125, for example bypassing a validation process in instances in which the updates performed by the SQL query involve static data, which may include data that may not change over predetermined periods of time.

The enrichment component 108 may receive the input files, for example from the file input 102, the loader component 104, the input converter 106, or any combination thereof. The enrichment component 108 may identify and extract data within a file from the array of files and deposit the data into a file of an updated file type. The enrichment component 108 may identify data within a file that can be changed to make the data conform to the updated file type without compromising what is represented by the data. For example, the enrichment component 108 may alter a date in which the day, month, and year are divided with dashes to be divided with slashes. The enrichment component 108 may rearrange data within the original file to make the data conform to the updated file type. For example, the enrichment component 108 may split data across multiple fields, such as dividing an address field into a street address, a state or province, and a zip code or postal code. Additionally or alternatively, the enrichment component 108 may compress data from multiple fields into a single field such as compressing a first name and a last name into a single name filed. The enrichment component 108 may provide placeholder data to enable a file to conform to the updated file type. For example, the updated file type may have space for three previous employers. The original file may include data for just two previous employers. The enrichment component 108 may insert placeholder data, such as a 555-5555 phone number, to satisfy the updated file type. The updated file type and the techniques used by the enrichment component 108 to satisfy the updated file type may vary based on the demands of the computing environment 100. Additionally, the computing environment 100 may host multiple enrichment components based on a variety of factors, such as the number of files within the input files or the average computational time and computational resources required to submit a file to the enrichment process.

In some examples, the enrichment component 108 can generate converted data based on the input files. The converted data may relate to an entity associated with a user of the computing environment 100, to a user associated with the entity, to one or more accounts controlled by or otherwise associated with the entity, etc. For example, and based on received input files, the enrichment component 108 can generate a set of entity functions 120, can generate a set of user functions 122, can generate a set of direct updates 124, and the like. The set of entity functions 120 can include one or more entity functions that each correspond to a different entity. For example, the enrichment component 108 can generate a first entity function corresponding to a first organization, such as a hospital, and can generate a second entity function corresponding to a second organization such as a charitable organization. In some examples, each entity function, or some subset thereof, can have various entity parameters such as an entity name or number, an account name or number, a location associated with the corresponding entity, an account location, and the like.

The set of user functions 122 can correspond to a particular entity function of the set of entity functions, and the set of user functions can include one or more users associated with a particular entity associated with the particular entity function. The set of user functions 122 can include one or more user functions that each correspond to a different user associated with the particular entity. For example, the particular entity can include a security agency, and the enrichment component 108 can generate the set of user functions to include a first user function corresponding to a security agency administrator, a second user function corresponding to a security agent, and so on. In some examples, each user function, or some subset thereof, can have various user parameters such as a user name or number, a user rule set or access level, a location associated with the corresponding user, whether the user is a single-sign-on (SSO) user or a non-SSO user, and the like.

The enrichment component 108 can additionally generate the set of direct updates 124. In some examples, a subset of the input files may be directly updated such as without generating a separate request, a separate validation, or the like. Some examples of the direct updates 124 can involve rules for data processing involving the target database 125. For example, and in examples in which the entity is a financial institution, the direct updates 124 can include rules defining how virtual endorsements can be accepted for initiating various interactions, defining local-level billing accounts, and the like. The enrichment component 108 can directly apply the direct updates 124 to the target database 125, and the enrichment component 108 can use the set of entity functions 120 and the set of user functions 122 to generate a SOAP request to update the target database 125. In some examples, the enrichment component 108 can transmit the SOAP request to the validation component 110.

The validation component 110 may receive the SOAP request from the enrichment component 108. The validation component 110 may further verify the set of entity functions 120 and the set of user functions 122 included in the SOAP request with techniques and criteria similar to the input converter 106, or other suitable components, and may determine whether the set of entity functions 120 and the set of user functions 122 are valid. For example, the validation component 110 can determine whether the SOAP request originated from an authorized source, whether the files included in the SOAP request conform to the formatting requirements of the target database 125, and the like.

Upon determining that the SOAP request is invalid, the validation component 110 can generate a negative notification 132 and transmit the negative notification 132 to an origination point of the SOAP request. For example, the validation component 110 can transmit the negative notification 132 to a user that initiated the update of the target database 125 using the input files. Additionally or alternatively, the negative notification 132 may include an indication that the SOAP request is invalid, is rejected, and the negative notification 132 may provide a root cause, which the validation component 110 may determine, that may indicate why the SOAP request failed. Upon determining that the SOAP request is valid, the validation component 110 can generate a positive notification 130 and transmit the positive notification 130 to the origination point of the SOAP request. Additionally, the validation component 110 can cause the SOAP request to be transmitted to the target database 125, to be applied to the target database 125, etc., for causing the target database 125 to be updated with the set of entity functions 120, the set of user functions 122, and the like.

Figure 2:
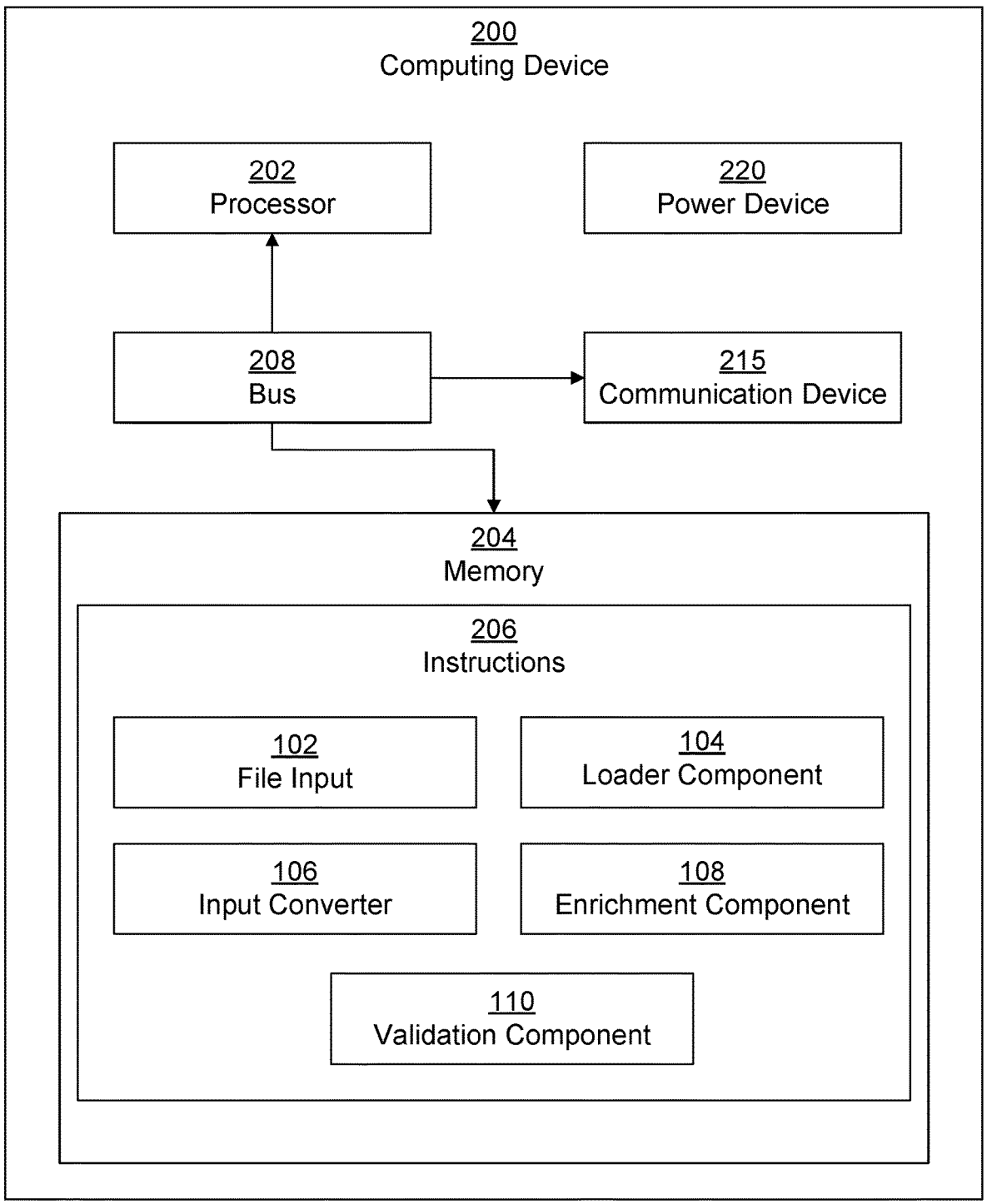
FIG. 2 is a block diagram of a computing device that can enrich one or more files for an automatic database update according to some examples of the present disclosure.

FIG. 2 is a block diagram of a computing device 200 that can enrich one or more files for an automatic database update according to some examples of the present disclosure. As illustrated, the computing device 200 can include a processor 202 that is communicatively coupled to a memory 204, for example via a bus 208, which can additionally be communicatively coupled to a communication device 215 that can be used to receive or transmit data with respect to the computing device 200. In some examples, the processor 202, the memory 204, and other components, such as a power device 220 that may be configured to provide power to the computing device 200, may be distributed from (e.g., remote to) one another.

The processor 202 can include one processing device or multiple processing devices. Non-limiting examples of the processor 202 include a Field-Programmable Gate Array (FPGA), an application-specific integrated circuit (ASIC), a microprocessor, etc. The processor 202 can execute instructions 206 stored in the memory 204 to perform operations. In some examples, the instructions 206 can include processor-specific instructions generated by a compiler or an interpreter from code written in a suitable computer-programming language, such as C, C++, C#, Perl, Java, Python, Fortran, etc.

The memory 204 can include one memory or multiple memories. The memory 204 can be non-volatile and may include any type of memory that retains stored information when powered off. Non-limiting examples of the memory 204 include electrically erasable and programmable read-only memory (EEPROM), flash memory, or any other type of non-volatile memory. At least some of the memory 204 can include a non-transitory, computer-readable medium form which the processor 202 can read instructions 206. A computer-readable medium can include electronic, optical, magnetic, or other storage devices capable of providing the processor 202 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 206. The memory may also include the file input 102, the loader component 104, the input converter 106, the enrichment component 108, and the validation component 110.

Figure 3:
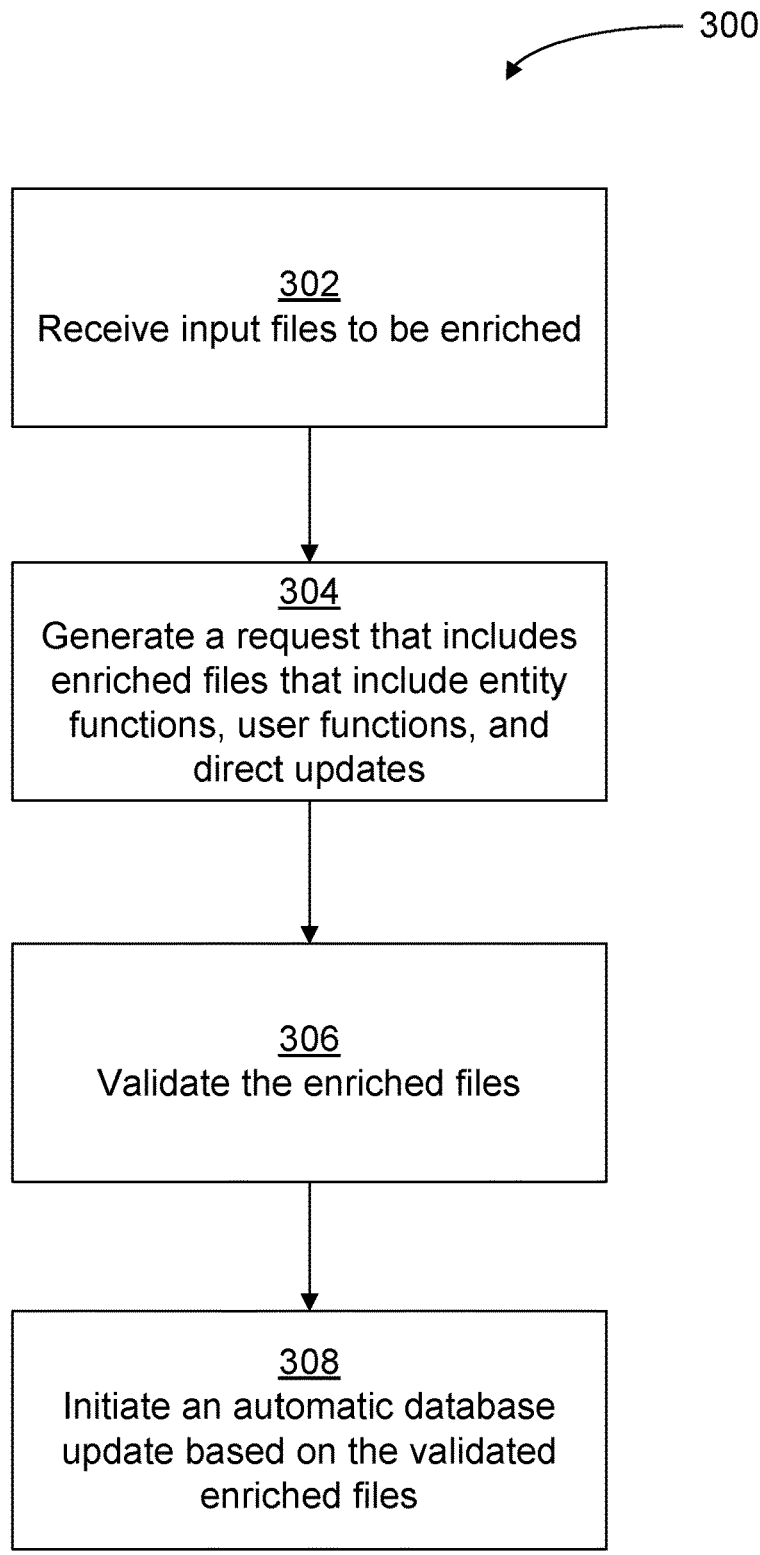
FIG. 3 is a flowchart of a process for enriching one or more files for an automatic database update according to some aspects of the present disclosure.

FIG. 3 is a flowchart of a process 300 for enriching one or more files for an automatic database update according to some aspects of the present disclosure. In some examples, automatically performing tasks, automated tasks, and the like may be performed without user input to initiate the tasks.

At block 302, the computing device 200 receives files to be enriched. In some examples, the files may be stored in an initial database (e.g., the initial database 101) or in other suitable locations. The initial database 101 may be in the process of being phased out of use, may be the database that is to be updated (e.g., the target database 125), etc. The files may relate to one or more entities. For example, the files may relate to a financial institution, to a security agency, to a medical provider, or the like. In a particular example, the files may relate to a first entity that is being acquired by, or has been acquired by, a second entity, and the files may be identified as nonconforming to parameters set or followed by the second entity.

In some examples, an entity, or a representative thereof, may periodically select files to be enriched for automatically updating the target database 125. For example, the entity may, upon identifying files that do not conform to storage or usage parameters, select the files to be enriched, transmit the files to be enriched, etc. In other examples, the computing device 200 may automatically and periodically retrieve files to be enriched. The computing device 200 may query one or more existing databases, obsolete databases, the initial database 101, or the like to identify files to be enriched for automatically updating the target database 125. Upon identifying the files to be enriched, the computing device 200 can automatically retrieve the files.

In a particular example involving a particular financial institution. The particular financial institution may have acquired a separate financial institution that managed or manages an initial database relating to on-site interaction files, and the particular financial institution may require that the on-site interaction files be enriched and transmitted to a remote interaction database (e.g., the target database 125). In some examples, the particular financial institution may identify the on-site interaction files to be migrated to the remote interaction database. In some examples, migrating the on-site interaction files to the remote interaction database may involve enriching the on-site interaction files, updating a format of the on-site interaction files, and the like.

At block 304, the computing device 200 generates a request with enriched files. The request may include a SQL query, a SOAP request, or other suitable request that can use the enriched files. The enriched files can include the set of entity functions 120, the set of user functions 122, the set of direct updates 124, and the like. In some examples, the request may be a set of requests. The set of requests may include (i) a SOAP request generated using a web interface and using the set of entity functions 120 and the set of user functions 122, and (ii) a SQL query generated using the web interface and using the set of direct updates 124. In some examples, the computing device 200 may automatically apply the set of direct updates 124 to the target database 125 using the SQL query and without including the direct updates 124 in the SOAP request.

In some examples, the computing device 200, or any component or service thereof (e.g., the input converter 106, the enrichment component 108, the validation component 110, etc.), can parse the received input files to determine the content included therein. In response to parsing the received files, the computing device 200, or any component or service thereof, can generate the requests, such as the SOAP request, the SQL query, and the like, to be transmitted to the target database 125 to be updated. In some examples, more than one request can be generated, more than one request type can be generated, etc. In a particular example, the computing device 200 can, in response to parsing the received files, generate a first SOAP request to generate or update the set of entity functions 120 in the target database 125, generate a second SOAP request to generate or update the set of user functions 122 in the target database 125, and so on. The computing device 200 can transmit, for example via a validation service (e.g., the validation component 110) the request, or set of requests, to the target database 125 to be updated.

At block 306, the computing device 200 validates the request. In some examples, the computing device 200 transmits the request, or set of requests, to a validation module, which may be separate, but communicatively coupled with, the computing device 200. In other examples, the computing device 200 can use the validation component 110 to validate the request or the set of requests. In a particular example, the computing device 200 can use the validation component 110 to validate the SOAP request for the set of entity functions 120, the SOAP request for the set of user functions 122, the SQL query for the set of direct updates 124, and the like. Validating the request or the set of requests may involve determining whether the request or the set of requests is authorized to be used to initiate an automatic database update.

In some examples, the computing device 200, or any component or service thereof, can determine that one or more requests of the set of requests are invalid. The one or more requests may have originated from an unauthorized source, may have errors included in content of the enriched files, may have errors included in the format of the enriched files, etc. In response to determining that the one or more requests are invalid, the computing device 200 may prevent the one or more requests from being used to automatically update the target database 125. Additionally or alternatively, the computing device 200 can determine a root cause (e.g., that the one or more requests may have originated from an unauthorized source, may have errors included in content of the enriched files, may have errors included in the format of the enriched files, etc.) for the one or more requests being invalid. The computing device 200 can generate a negative notification 132 that includes indications that the one or more requests are determined to be invalid, the root cause, and other suitable indications for the negative notification 132. The computing device 200 can transmit the negative notification 132 to an origination point (e.g., a display device via a user interface, etc.) from which the input files were indicated to be enriched. Additionally, the computing device 200 may use remaining requests of the set of requests to initiate an automatic update of the target database 125.

In some examples, the computing device 200, or any component or service thereof, can determine that the set of requests (or any subset thereof) is valid. In response to determining that the set of requests is valid, the computing device 200 can generate a positive notification 130 that includes an indication that the set of tests is valid, that the automatic update to the target database 125 is being initiated, etc. In response to determining whether the set of tests is valid, and in response to generating and transmitting the positive notification 130, the negative notification 132, or a combination thereof, the computing device 200 can transmit the set of requests to the target database 125 to initiate the automatic update of the target database 125.

At block 308, the computing device 200 initiates an automatic database update based on the validated request. The computing device 200 may transmit the request or the set of requests to the target database 125 to automatically update the target database 125. Automatically updating the target database 125 may involve migrating the enriched files from an initial database 101 to the target database 125, updating a format or formats of the target database 125 based on migrated, enriched files, and the like. Additionally or alternatively, the computing device 200 may generate a migration report that includes an indication of a first subset of enriched files that were migrated to the target database 125, an indication of one or more root causes why a second subset of enriched files were not migrated, and other suitable indications.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
   a processor; and
   a non-transitory computer-readable medium comprising instructions that are executable by the processor to cause the processor to perform operations comprising:
   receiving a set of input files from an initial database that comprises data in a first format;
   determining that the set of input files is nonconforming to a standard associated with a second format that is different than the first format, wherein a target database is configured to store files in the second format;
   in response to determining that the set of input files is nonconforming, enriching the set of input files to generate a set of enriched files that has the second format by:
      generating a set of entity functions, a set of user functions, and a set of direct updates based on the set of input files, wherein each user function of the set of user functions comprises user parameters including a user name or number of a corresponding user, a user rule set or access level of the corresponding user, a location associated with the corresponding user, and an indication of whether the corresponding user is a single-sign-on (SSO) user or a non-SSO user; and
      generating one or more simple object access protocol (SOAP) requests and one or more structured query language (SQL) queries based on the set of entity functions, the set of user functions, and the set of direct updates, wherein a first SOAP request includes the set of entity functions and a second SOAP request includes the set of user functions, and wherein the one or more SQL queries are based at least in part on the set of direct updates;
   generating a validated set of enriched files by:
      determining that a subset of the set of enriched files has an error; and
      removing the subset from the set of enriched files to generate the validated set of enriched files; and
   initiating an automatic update of a target database by transmitting the validated set of enriched files to the target database that is compatible with the second format.

2. The system of claim 1, wherein the system and the target database are associated with a first entity, and wherein the initial database is associated with a second entity that is included in a subset of the first entity.

3. The system of claim 1, wherein the operation of generating the validated set of enriched files comprises:
   validating the one or more SOAP requests by determining whether any error exists in the one or more SOAP requests and whether the set of entity functions or the set of user functions have a format that is incompatible with the second format; and
   validating the one or more SQL queries by determining whether the one or more SQL queries includes any error.

4. The system of claim 3, wherein the operation of generating the validated set of enriched files comprises:
   in response to determining that the one or more SOAP requests is invalid, transmitting a negative notification to a user of the system and preventing the target database from being updated with the one or more SOAP requests; or
   in response to determining that the one or more SOAP requests is valid, transmitting a positive notification to the user of the system and allowing the target database to be updated with the one or more SOAP requests.

5. The system of claim 1, wherein:
   each entity function of the set of entity functions comprises entity parameters including an entity name or number of a corresponding entity, an account name or number of the corresponding entity, a location associated with the corresponding entity, and a location corresponding to the account name or number of the corresponding entity.

6. A method comprising:
   receiving, by a computing device, a set of input files from an initial database that comprises data in a first format;
   determining that the set of input files is nonconforming to a standard associated with a second format that is different than the first format, wherein a target database stores files in the second format;
   in response to determining that the set of input files is nonconforming, enriching, by the computing device, the set of input files to generate a set of enriched files that has the second format by:

generating a set of entity functions, a set of user functions, and a set of direct updates based on the set of input files, wherein each user function of the set of user functions comprises user parameters including a user name or number of a corresponding user, a user rule set or access level of the corresponding user, a location associated with the corresponding user, and an indication of whether the corresponding user is a single-sign-on (SSO) user or a non-SSO user; and generating one or more simple object access protocol (SOAP) requests and one or more structured query language (SQL) queries based on the set of entity functions, the set of user functions, and the set of direct updates, wherein a first SOAP request includes the set of entity functions and a second SOAP request includes the set of user functions, and wherein the one or more SQL queries are based at least in part on the set of direct updates;

generating, by the computing device, a validated set of enriched files by:
  determining that a subset of the set of enriched files has an error; and
  removing the subset from the set of enriched files to generate the validated set of enriched files; and initiating, by the computing device, an automatic update of a target database by transmitting the validated set of enriched files to the target database that is compatible with the second format.

7. The method of claim 6, wherein the target database is associated with a first entity, and wherein the initial database is associated with a second entity that is included in a subset of the first entity.

8. The method of claim 6, wherein generating the validated set of enriched files comprises:
  validating the one or more SOAP requests by determining whether any error exists in the one or more SOAP requests and whether the set of entity functions or the set of user functions have a format that is incompatible with the second format; and
  validating the one or more SQL queries by determining whether the one or more SQL queries includes any error.

9. The method of claim 8, wherein generating the validated set of enriched files comprises:
  in response to determining that the one or more SOAP requests is invalid, transmitting a negative notification to a user associated with the target database and preventing the target database from being updated with the one or more SOAP requests; or
  in response to determining that the one or more SOAP requests is valid, transmitting a positive notification to the user associated with the target database and allowing the target database to be updated with the one or more SOAP requests.

10. The method of claim 6, wherein:
each entity function of the set of entity functions comprises entity parameters including an entity name or number of a corresponding entity, an account name or number of the corresponding entity, a location associated with the corresponding entity, and a location corresponding to the account name or number of the corresponding entity.

11. A non-transitory computer-readable medium comprising instructions that are executable by a processing device for causing the processing device to perform operations comprising:

receiving a set of input files from an initial database that comprises data in a first format;

determining that the set of input files is nonconforming to a standard associated with a second format that is different than the first format, wherein a target database is configured to store files in the second format;

in response to determining that the set of input files is nonconforming, enriching the set of input files to generate a set of enriched files that has the second format by:
  generating a set of entity functions, a set of user functions, and a set of direct updates based on the set of input files, wherein each user function of the set of user functions comprises user parameters including a user name or number of a corresponding user, a user rule set or access level of the corresponding user, a location associated with the corresponding user, and an indication of whether the corresponding user is a single-sign-on (SSO) user or a non-SSO user; and
  generating one or more simple object access protocol (SOAP) requests and one or more structured query language (SQL) queries based on the set of entity functions, the set of user functions, and the set of direct updates, wherein a first SOAP request includes the set of entity functions and a second SOAP request includes the set of user functions, and wherein the one or more SQL queries are based at least in part on the set of direct updates;

generating a validated set of enriched files by:
  determining that a subset of the set of enriched files has an error;
  removing the subset from the set of enriched files to generate the validated set of enriched files; and initiating an automatic update of a target database by transmitting the validated set of enriched files to the target database that is compatible with the second format.

12. The non-transitory computer-readable medium of claim 11, wherein the target database is associated with a first entity, and wherein the initial database is associated with a second entity that is included in a subset of the first entity.

13. The non-transitory computer-readable medium of claim 11, wherein the operation of generating the validated set of enriched files comprises:
  validating the one or more SOAP requests by determining whether any error exists in the one or more SOAP requests and whether the set of entity functions or the set of user functions have a format that is incompatible with the second format;
  validating the one or more SQL queries by determining whether the one or more SQL queries includes any error; and
  in response to determining that the one or more SOAP requests is invalid, transmitting a negative notification to a user associated with the target database and preventing the target database from being updated with the one or more SOAP requests; or
  in response to determining that the one or more SOAP requests is valid, transmitting a positive notification to the user associated with the target database and allowing the target database to be updated with the one or more SOAP request.

14. The non-transitory computer-readable medium of claim 11, wherein:

each entity function of the set of entity functions comprises entity parameters including an entity name or number of a corresponding entity, an account name or number of the corresponding entity, a location associated with the corresponding entity, and a location corresponding to the account name or number of the corresponding entity.

\* \* \* \* \*